United States Patent
Yoshida (10) Patent No.: US 9,204,034 B2
(45) Date of Patent: Dec. 1, 2015

(54) IMAGE PROCESSING APPARATUS AND IMAGE PROCESSING METHOD

(71) Applicant: CANON KABUSHIKI KAISHA, Tokyo (JP)

(72) Inventor: Nobukazu Yoshida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/095,250

(22) Filed: Dec. 3, 2013

(65) Prior Publication Data
US 2014/0185870 A1    Jul. 3, 2014

(30) Foreign Application Priority Data

Dec. 27, 2012 (JP) ................................. 2012-285260

(51) Int. Cl.
*G06K 9/00* (2006.01)
*H04N 5/232* (2006.01)

(52) U.S. Cl.
CPC ................................ *H04N 5/23212* (2013.01)

(58) Field of Classification Search
USPC ........................................................ 382/103
See application file for complete search history.

(56) References Cited

U.S. PATENT DOCUMENTS

| 5,448,243 | A  | * | 9/1995 | Bethke et al. | .................... 342/59 |
| 5,835,616 | A  | * | 11/1998 | Lobo et al. | .................... 382/118 |
| 7,831,138 | B2 | * | 11/2010 | Nakahara | ..................... 396/121 |
| 2004/0239983 | A1 | * | 12/2004 | Shiota | ......................... 358/1.15 |
| 2009/0297134 | A1 | * | 12/2009 | Hosoi | ........................... 396/123 |
| 2011/0074928 | A1 | * | 3/2011 | Misawa | ......................... 348/47 |
| 2013/0101177 | A1 | * | 4/2013 | Yamada et al. | ............... 382/107 |

FOREIGN PATENT DOCUMENTS

JP      11-266388 A     9/1999

* cited by examiner

*Primary Examiner* — Gregory F Cunningham
(74) *Attorney, Agent, or Firm* — Canon USA, Inc., IP Division (57) ABSTRACT

An image processing apparatus includes an object distance information acquisition unit configured to acquire information regarding a distance to an object detected from acquired image data, a distance information acquisition unit configured to divide the image data into small areas and acquire object distance information for each of the small areas, a determination unit configured to determine a blurring level for each of the small areas, and a blurring processing unit configured to perform blurring processing on the image data based on the blurring level. The determination unit identifies an object located within a predetermined distance from a main object based on the distance information acquired by the object distance information acquisition unit, and determines a distance group of the identified object as a non-blur area.

18 Claims, 6 Drawing Sheets

FIG.5A
OBJECT

FIG.5B
DISTANCE MAP

| 90 | 91 | 90 | 90 | 89 | 90 | 90 | 90 |
|----|----|----|----|----|----|----|----|
| 90 | 90 | 90 | 92 | 90 | 90 | 91 | 90 |
| 90 | 90 | 90 | 90 | 90 | 17 | 18 | 17 |
| 93 | 90 | 12 | 12 | 17 | 18 | 17 | 17 |
| 90 | 91 | 12 | 13 | 17 | 17 | 17 | 19 |
| 90 | 90 | 90 | 9 | 9 | 9 | 9 | 9 |
| 90 | 90 | 9 | 8 | 9 | 9 | 9 | 9 |
| 92 | 90 | 8 | 9 | 9 | 9 | 9 | 9 |
| 90 | 90 | 90 | 9 | 9 | 9 | 9 | 9 |
| 90 | 93 | 90 | 9 | 9 | 90 | 90 | 91 |
| 90 | 90 | 9 | 9 | 90 | 88 | 90 | 90 |
| 90 | 90 | 90 | 89 | 90 | 90 | 91 | 90 |

FIG.5C
COLOR GROUP

FIG.5D
DISTANCE GROUP

| 3 | 3 | 3 | 3 | 3 | 3 | 3 | 3 |
|---|---|---|---|---|---|---|---|
| 3 | 3 | 3 | 3 | 3 | 3 | 3 | 3 |
| 3 | 3 | 3 | 3 | 3 | 2 | 2 | 2 |
| 3 | 3 | 3 | 1 | 1 | 2 | 2 | 2 |
| 3 | 3 | 3 | 1 | 1 | 2 | 2 | 2 |
| 3 | 3 | 3 | 3 | 3 | 0 | 0 | 0 |
| 3 | 3 | 3 | 0 | 0 | 0 | 0 | 0 |
| 3 | 3 | 0 | 0 | 0 | 0 | 0 | 0 |
| 3 | 3 | 3 | 3 | 0 | 0 | 0 | 0 |
| 3 | 3 | 3 | 0 | 0 | 3 | 3 | 3 |
| 3 | 3 | 0 | 0 | 3 | 3 | 3 | 3 |
| 3 | 3 | 3 | 3 | 3 | 3 | 3 | 3 |

FIG.6

IMAGE PROCESSING APPARATUS AND IMAGE PROCESSING METHOD

BACKGROUND OF THE INVENTION

1. Field of the Invention

The present invention relates to an image processing apparatus for performing blurring processing and an image processing method thereof.

2. Description of the Related Art

Some conventional image processing apparatuses perform image processing in which a blur effect is applied to a captured image. For example, Japanese Laid-Open Patent Application No. 11-266388 discusses a technique that measures distances to a plurality of objects and performs blurring processing according to the distances.

However, there has been a problem that the blurring processing according to the distances will cause blurring of an area which is not supposed to be blurred if the accuracy of information of the distances is low.

SUMMARY OF THE INVENTION

The present invention is directed to an image processing apparatus capable of generating an image to which a more natural blur effect is applied if a plurality of objects is photographed.

According to an aspect of the present invention, an image processing apparatus includes an acquisition unit configured to acquire image data, a detection unit configured to detect objects from the image data, a selection unit configured to select a main object from the detected objects, an object distance information acquisition unit configured to acquire information regarding distances to the detected objects, a distance information acquisition unit configured to divide the image data into small areas and acquire object distance information for each of the small areas, a distance grouping unit configured to, based on the distance information, group the small areas into distance groups defined by different distance ranges, a determination unit configured to determine a blurring level for each of the distance groups, and a blurring processing unit configured to perform blurring processing on the image data based on the blurring level. The determination unit identifies an object located within a predetermined distance from the main object, based on the distance information acquired by the object distance information acquisition unit, and determines a distance group of the identified object as a non-blur area.

Further features of the present invention will become apparent from the following description of exemplary embodiments with reference to the attached drawings.

DESCRIPTION OF THE EMBODIMENTS

Figure 1:
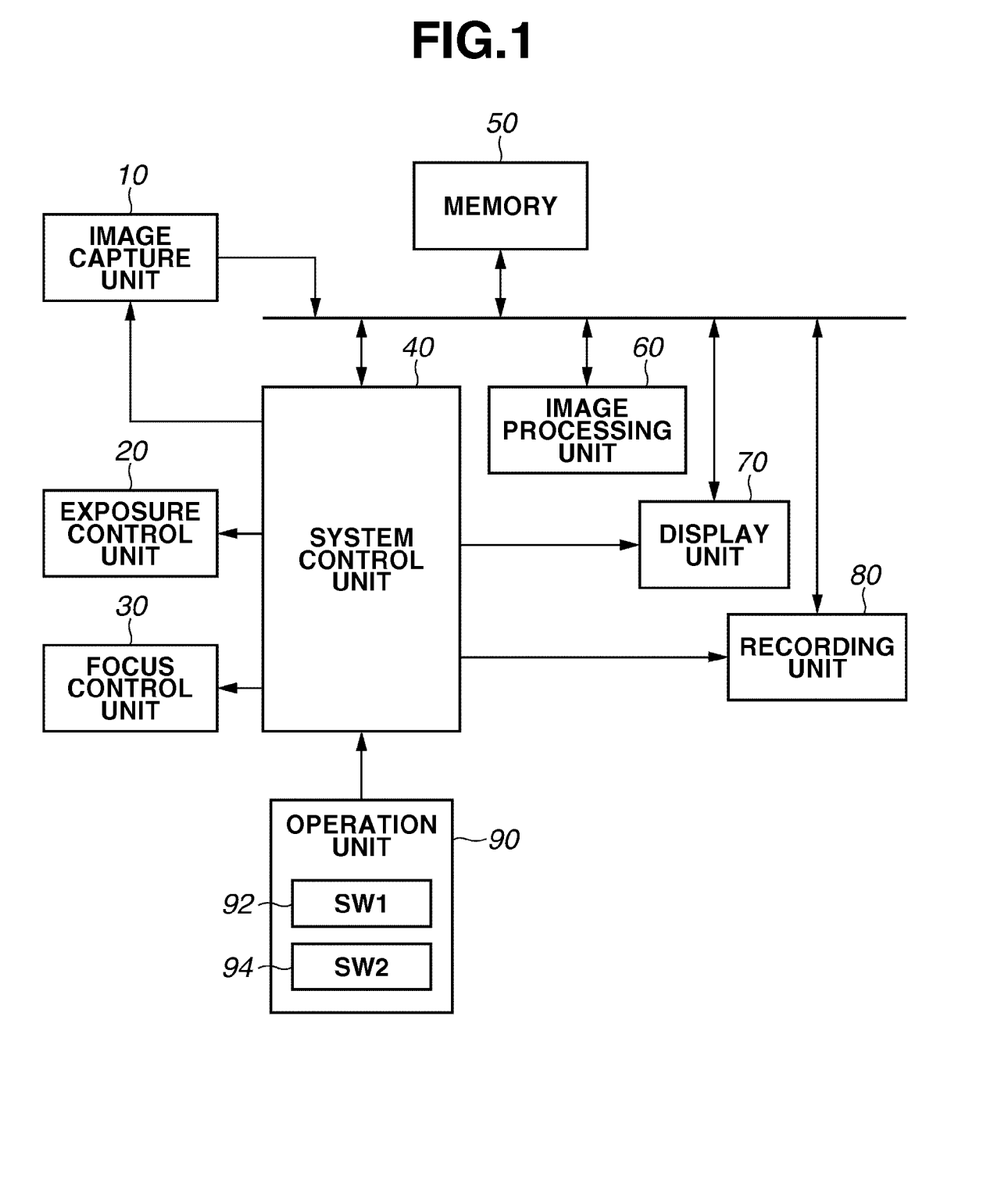
FIG. 1 is a block diagram illustrating a configuration of an image capture apparatus, which is an image processing apparatus according to a first exemplary embodiment of the present invention.

FIG. 1 illustrates an image capture apparatus according to a first exemplary embodiment of the present invention.

An image capture unit 10 receives a light flux incident on an imaging optical system, and performs analog/digital (A/D) conversion to output a digitalized image signal. The image capture unit 10 includes a lens group including a focusing lens, a shutter, a diaphragm, and an image sensor as components of the imaging optical system. The shutter and the diaphragm can be controlled by an exposure control unit 20, and the focusing lens can be controlled by a focus control unit 30. In the first exemplary embodiment, an X-Y address type, complementary metal-oxide-semiconductor (CMOS) sensor with a Bayer array of RGB pixels is used as the image sensor. However, the image sensor is not limited to this. For example, the image sensor may be a charged coupled device (CCD) sensor or a sensor with an array of complementary-color pixels. All or part of the lens group including the focusing lens, the shutter, and the diaphragm in the imaging optical system may be configured as accessories that can be attached/detached to/from the image capture apparatus.

Image data output from the image capture unit 10 can be input to an image processing unit 60 and stored in a memory 50 at the same time. The image data stored in the memory 50 can be read out by a system control unit 40. The system control unit 40 can refer to the image data and can input the read-out data to the image processing unit 60. The image processing unit 60 performs de-mosaicing processing, white balance processing, distortion correction processing, gamma correction processing, and color conversion processing on the input image. The processing is performed based on information acquired through an image analysis and photographing conditions such as a shutter speed, a diaphragm, and International Organization for Standardization (ISO) sensitivity. The image data subjected to image processing in the image processing unit 60 can be rewritten in the memory 50, and the system control unit 40 can write desired data in the memory 50. The image processing unit 60 can apply a blur effect to the input image. Further, the image processing unit 60 can detect a face by extracting a feature from the input image, and divide the input image into groups of similar colors.

A display unit 70 can perform D/A conversion on digital image data, which has been subjected to image processing in the image processing unit 60 and then recorded in the memory 50, and display the resultant image on a display medium such as a liquid crystal display. The display unit 70 can display not only image data but also desired information alone or with an image. Thus, the display unit 70 can display exposure information at the time of shooting, and display a frame around a detected face area.

A recording unit 80 can store captured image data in a recording medium such as a read only memory (ROM) and a secure digital (SD) card.

Figure 2:
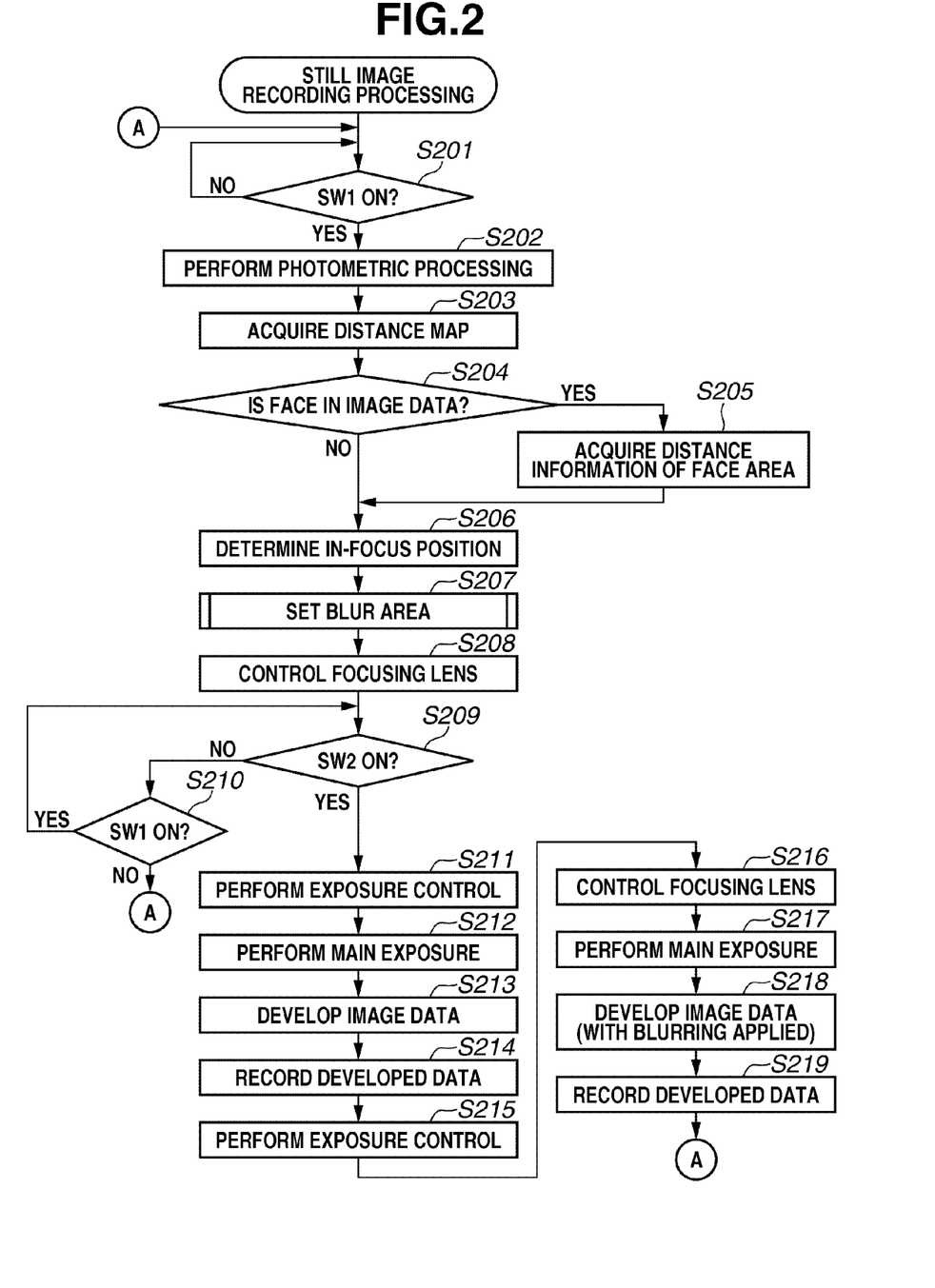
FIG. 2 is a flowchart of still image recording processing according to the first exemplary embodiment of the present invention.

An operation unit 90 includes particularly a first shutter switch SW1 (92) and a second shutter switch SW2 (94) for giving a shooting instruction. The first shutter switch SW1 (92) is turned on in the middle of operation of a shutter button (not illustrated), and gives an instruction to start a shooting preparation operation such as automatic exposure control and automatic focus control. The second shutter switch SW2 (94) is turned on at the completion of operation of the shutter button (not illustrated), and enables an operation of giving an instruction for still image shooting. The operation unit 90 further includes a mode changing switch which switches a camera operation mode among a still image shooting mode, a moving image shooting mode, and a playback mode, and a parameter selection switch which allows camera settings to be changed. FIG. 2 is a flowchart illustrating still image recording processing in the first exemplary embodiment.

The operation in each of the steps is executed by the system control unit 40 or by any of the units such as the image processing unit 60 according to an instruction from the system control unit 40.

As outputs of the still image recording processing, first and second images are recorded. The first image is a normal image on which no blurring processing is performed, and the second image is an image where a blur effect is applied to an area other than a main object so that the main object is highlighted.

In step S201, the system control unit 40 determines whether the first shutter switch SW1 (92) is turned on. If the system control unit 40 determines that the first shutter switch SW1 (92) is turned on (YES in step S201), the processing proceeds to step S202.

In step S202, the system control unit 40 performs photometric processing to calculate the luminance value of an object. The luminance value of the object is calculated based on the luminance value of image data that is output from the image capture unit 10 and on the exposure condition at the time when the image is exposed.

In step S203, the system control unit 40 (object distance information acquisition unit) acquires a distance map (object distance information). In the first exemplary embodiment, the distance map has a form of a matrix data table that shows the distance information of each small area in an angle of view. As an example of a method for measuring an object distance according to the first exemplary embodiment, a measurement method using a contrast evaluation value will be described. First, M×N distance measurement areas are set in an angle of view (image data is divided into small areas). Then, the focus control unit 30 moves the focusing lens to obtain an autofocus (AF) evaluation value, which indicates the contrast of image data that is output from the image capture unit 10, for each of the distance measurement areas. The AF evaluation value is output from the image processing unit 60 or can be obtained through calculation in the system control unit 40 based on the image data or an output from the image processing unit 60. From the obtained AF evaluation values corresponding to focusing lens positions for each of the distance measurement areas, the focusing lens position at which the evaluation value is the highest (hereinafter, referred to as the peak position) is obtained for each of the distance measurement areas. The peak position corresponds to the distance information on an object distance for each of the areas. Here, the distance map is the peak position information of M×N areas.

A method for acquiring the distance information on an object distance for each of the areas is not limited to that described above. For example, as a method of measuring an object distance by comparing two or more images obtained with the same angle of view and different focus positions, a method of estimating the object distance based on an edge difference, or a method using depth from defocus (DFD) may be employed. Alternatively, a distance measurement sensor that measures a distance based on a phase difference may be provided separately from the image capture unit 10. Pixels for pupil division, which allow phase-difference focus detection to be performed, may be disposed in a pixel array of the image sensor of the image capture unit 10 to measure a distance based on an output from the pixels for the focus detection.

In step S204, the system control unit 40 determines whether a distinctive object, for example, a face, has been detected in the image data that is output from the image capture unit 10. If the system control unit 40 determines that a face area has been detected (YES in step S204), the processing proceeds to step S205. In step S205, the face area is set to a distance measurement area, and the focusing lens position at which the AF evaluation value is the highest in the face area (i.e., the peak position) is obtained. In the first exemplary embodiment, the resultant peak position corresponds to the distance information of the face area. As for detecting a face, a face detection result can be obtained by inputting image data to the image processing unit 60. The face detection method is not particularly limited, and a publicly known technique such as pattern matching and feature point extraction can be employed. In the first exemplary embodiment, a face is used as an example of an object to be detected. However, the object is not limited to a face. Other objects (object areas) may be detected using a publicly known object detection method.

In step S206, the system control unit 40 determines the focus position, to which the focusing lens is moved to focus on the object, as the in-focus position. The in-focus position is determined based on the distance map obtained in step S203 and the distance information of the face area obtained in step S205. For example, if a face has been detected, the face area is determined as the in-focus position, and if no face has been detected, the focus position at which the closest area is more likely to be focused on is determined as the in-focus position. If a plurality of faces has been detected, a main object face is estimated based on the sizes and positions of the detected face areas in the image, and the focusing lens position at which the main object area is focused on is determined as the in-focus position.

After acquiring the distance information of each of the areas in steps S203 and S205, in step S207, the system control unit 40 determines a blur area (an area to be blurred) and a non-blur area (an area not to be blurred) for blurring processing. The system control unit 40 also determines the blurring amount for each blur area. The blur area setting processing in step S207 will be described below with reference to FIG. 3.

In step S208, the focus control unit 30 moves the focusing lens to the in-focus position determined in step S206 so that the object is focused on.

In step S209, the system control unit 40 determines whether the second shutter switch SW2 (94) is turned on. If the system control unit 40 determines that the second shutter switch SW2 (94) is turned off (NO in step S209), the processing proceeds to step S210. If the system control unit 40 determines that the second shutter switch SW2 (94) is turned on (YES in step S209), the processing proceeds to step S211.

In step S210, the system control unit 40 determines whether the first shutter switch SW1 (92) is turned on. If the system control unit 40 determines that the first shutter switch SW1 (92) is turned on (YES in step S210), the processing proceeds to step S209. If the system control unit 40 determines that the first shutter switch SW1 (92) is turned off (NO in step S210), the processing returns to step S201. The steps S209 and S210 are repeated while the first shutter switch SW1 (92) is turned on and the second shutter switch SW2 (94) is turned off.

In step S211, the system control unit 40 performs exposure control for the first still image shooting. The system control unit 40 determines exposure for the first still image shooting based on the luminous value obtained in step S202, and causes the exposure control unit 20 to control the diaphragm or the shutter.

When the exposure control is completed, the processing proceeds to step S212 for a main exposure operation. In step S212, the image sensor of the image capture unit 10 is exposed to light, and output image data is stored in the memory 50.

In step S213, development processing is performed on the captured image data. Here, no blurring processing is performed on the data.

In step S214, the recording unit 80 records the developed data in a medium.

In step S215, the system control unit 40 proceeds to the second still image shooting. The second image to be captured is subject to the blurring processing.

In step S215, the system control unit 40 performs exposure control for the second still image shooting. The setting for the exposure is basically the same as that for the first image, and thus this exposure control can be omitted as necessary. Here, if the difference in the evaluation value between the first image and the second image is a predetermined value or higher, a configuration may be employed in which no blurring processing is performed, and the first image or the second image to be obtained by the main exposure is recorded.

In step S216, the focusing lens is moved to a position at which the non-blur area set in step S207 is focused on in order to perform blurring processing on the second image. If the focusing lens position is the same as that for the first still image shooting, this control may be omitted.

In step S217, the system control unit 40 performs the main exposure for the second still image shooting. The resultant data is stored in the memory 50. If the exposure set in step S215 and the position to which the focusing lens is moved in step S216 are the same as those for the first still image shooting, the operations in steps S215 to S217 can be omitted, and the exposure data for the first image can be reused as the exposure data for the second image.

In step S218, the system control unit 40 performs development processing on the captured image data. Here, blurring processing is performed based on the blur area and the blurring amount (blurring level) set in step S207.

In the first exemplary embodiment, blurring processing is performed as follows. Blurring is uniformly applied to the entire original image data in advance. The resultant data is subjected to blurring processing in a plurality of blurring levels, and blurred images with multiple blurring levels are generated. Then, an appropriate blurred image is combined in layers with each of the areas in the image according to the object distance of the area. The blurring processing is not limited to this. Filter processing in which a different number of taps is used for each of the areas may be performed so that blurring processing of multiple blurring levels is performed for each of the areas.

In step S219, the recording unit 80 records the developed data in a medium.

Figure 3:
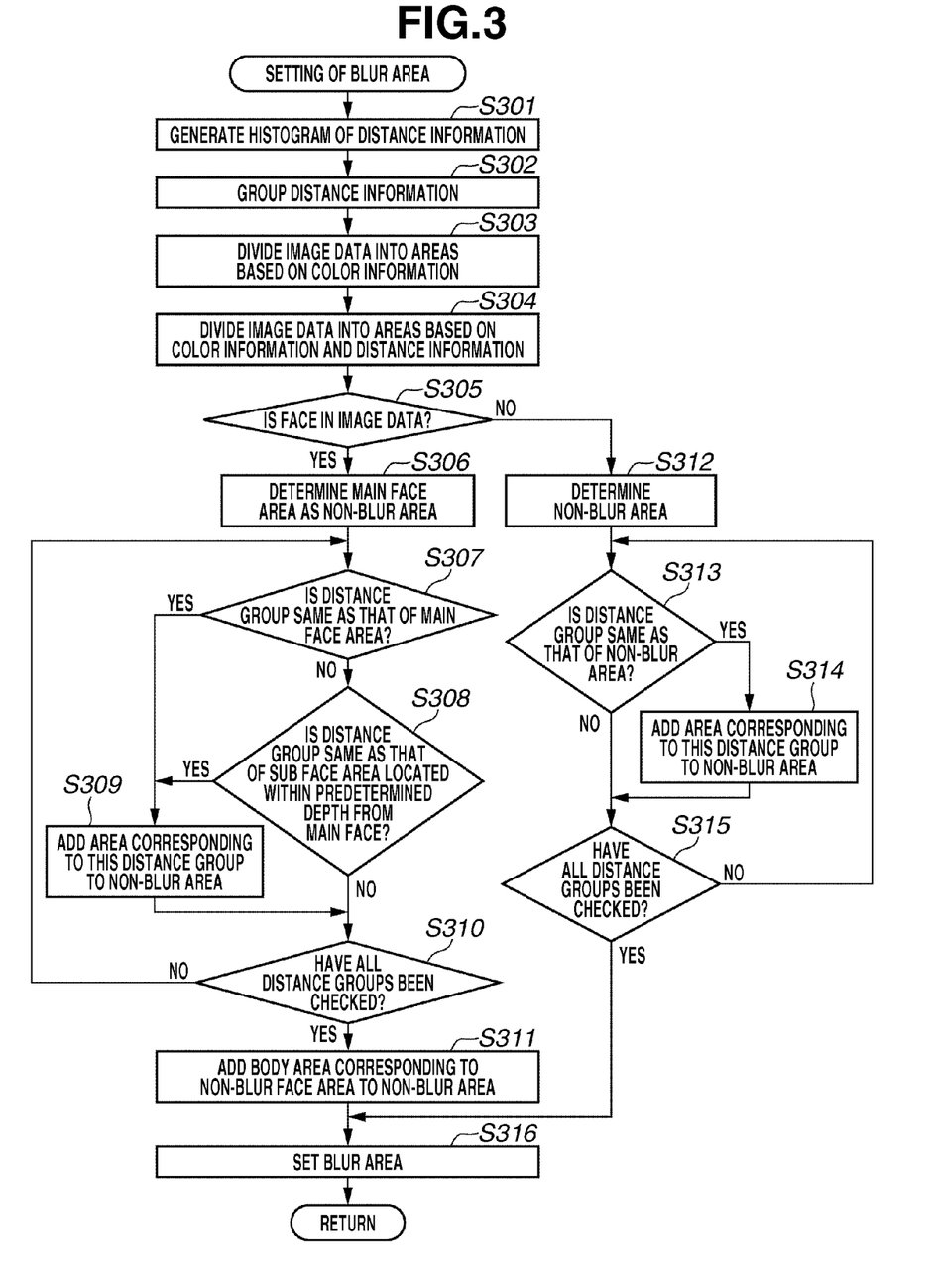
FIG. 3 is a flowchart of blur area setting processing according to the first exemplary embodiment of the present invention.

FIG. 3 is a flowchart of the blur area setting processing performed in step S207 in FIG. 2. The operation in each of the steps is executed by the system control unit 40 or by any of the units such as the image processing unit 60 based on an instruction from the system control unit 40.

First, in step 301, the system control unit 40 generates a distance histogram from the distance map obtained in step S203. If the distance map includes peak positions of M×N areas as distance information, a histogram (hereinafter referred to as distance histogram) having M×N number of peak positions as elements is generated.

Next, in step S302, the system control unit 40 divides the distance information (peak positions) into a plurality of groups based on the distance histogram generated in step S301 (which is called distance grouping). For example, the maximum point in the histogram is found, and then points satisfying any of the following conditions are searched for based on the maximum point.

Figure 4:
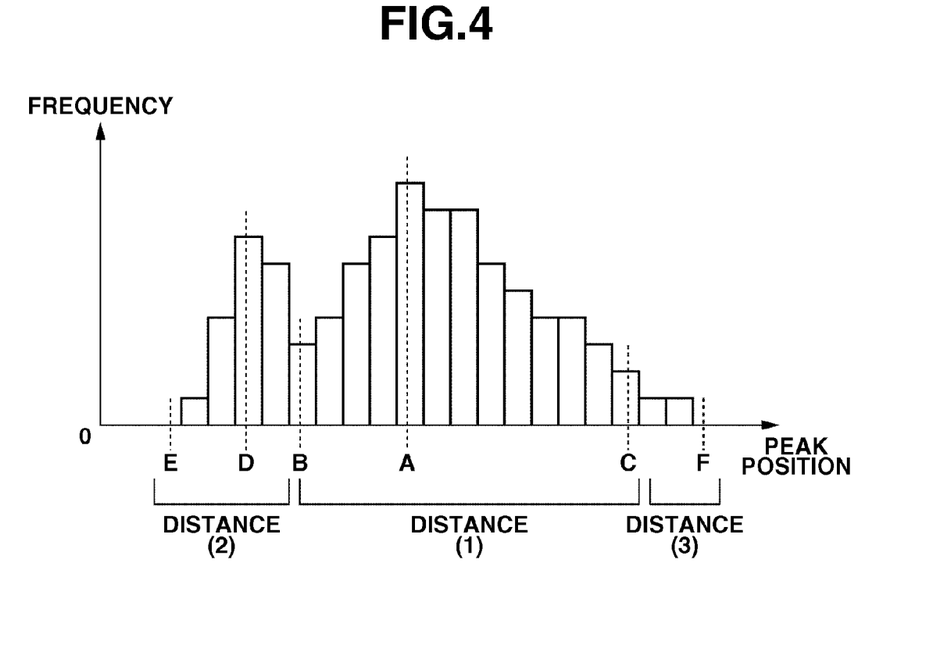
FIG. 4 is a diagram illustrating an example of a distance histogram according to the first exemplary embodiment of the present invention.

- a point of which the value is a predetermined value or smaller (0 in the first exemplary embodiment)
- a minimum point of which the value is half as large as that of another point, or smaller
- a point at which the number of monotonously decreasing sections from the maximum point exceeds a predetermined value The peak positions are grouped by using points satisfying any of the conditions described above as group boundaries. First, a maximum point A with the highest frequency is found, and a point satisfying any of the conditions described above is searched for. On the left side of the maximum point A, a minimum point B of which the value is half as large as that of another point or smaller is found, and on the right side of the maximum point A, a point C at which the number of monotonously decreasing sections from the maximum point A exceeds a predetermined value (eight, for example) is found. Thus, a distance 1 having the points B and C as group boundaries is defined as a single group. Next, a maximum point D with the highest frequency in the remaining sections is found, and a point satisfying any of the conditions is similarly searched for. Then, a point E at which the value is 0 is found, and thus a distance 2 having the point E as the group boundary is defined as a single group. Similarly, a distance 3 is defined as a single group, whereby the peak positions are divided into three groups. The condition to search for the minimum point is not limited to that described above. The minimum point may be a point smaller than another point by a predetermined frequency, or a point of which the value is the smallest in a predetermined range of sections.

In step S303, the system control unit 40 divides the image data into areas based on the color information thereof. More specifically, areas with similar colors are grouped into the same color group. First, the image data is divided into m×n small areas, and color information is obtained for each of the small areas. For example, the image data that is output from the image capture unit 10 is converted into luminous/color phase/color saturation information, and the obtained color phase information may be used as the color information. A color histogram is generated from the m×n pieces of the color information, and the pieces of the color information are grouped into a plurality of groups based on the color histogram through similar processing to that in step S302. The m×n areas can be divided into a plurality of groups, depending on which group the color information of each of the m×n areas belongs to. A group of areas having the color information belonging to the same group generated by such division is hereinafter referred to as a color group.

Next, in step S304, the system control unit 40 refers to the color groups obtained by the division in step S303, the distance map acquired in step S203, and the distances grouped in step S302, and then groups the color groups whose peak positions are in the same peak position group, as the same division area. First, the system control unit 40 refers to the peak position in the distance map, which corresponds to the area of each of the color groups. The peak position group that the peak position belongs to is obtained from the result of the operation in step S302 and is determined as the peak position group of the color group. If there is a plurality of peak positions in the distance map, which correspond to the area of a color group, for example, if the area of a single color group overlaps a plurality of the M×N small areas, the peak position group that the average of the peak positions belong to may be obtained and determined as the peak position group of the color group. Or, the peak positions may be differently weighted according to how the area of the color group overlaps the M×N small areas. Finally, the color groups in the same peak position group are grouped into a single distance group. Thus, a distance group is a group of areas which are obtained by dividing image data based on the color information and distance information and belong to the same peak position group.

Figure 5A:
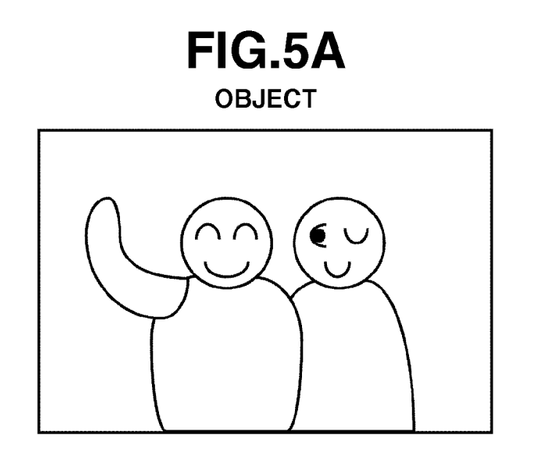
FIGS. 5A, 5B, 5C, and 5D are diagrams illustrating an example of grouping according to the first exemplary embodiment of the present invention.
Figure 5B:
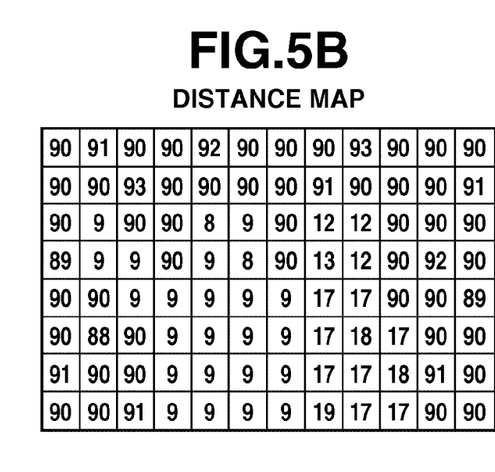
Figure 5C:
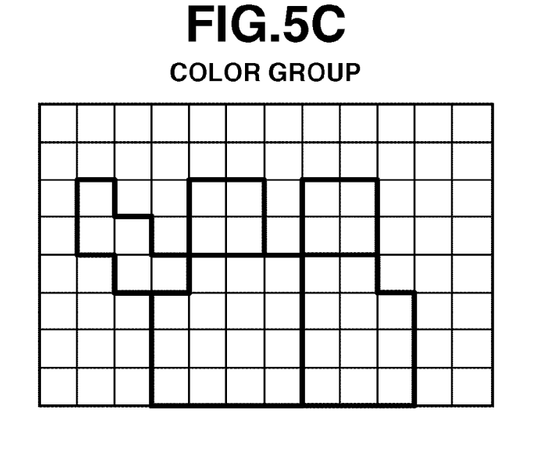
Figure 5D:
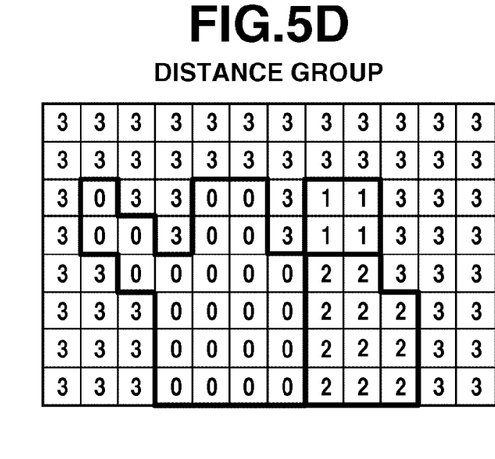

A case will be described in which an image of objects illustrated in FIG. 5A is captured, and a distance map illustrated in FIG. 5B and a color group illustrated in FIG. 5C are obtained. For simplifying the description, the value of both M and m is 8 and the value of both N and n is 12. If the peak positions are grouped into a group of 8 and 9 (distance 0), a group of 12 and 13 (distance 1), a group of 17 to 19 (distance 2), and a group of 88 to 93 (distance 3) in step S302, the distance group illustrated in FIG. 5D is obtained.

In step S305, the system control unit 40 determines whether a distinctive object such as a face has been detected in the image data. If the system control unit 40 determines that a face has been detected (YES in step S305), then in step S306, the system control unit 40 determines the area of a main object face, which is identified among the detected faces, as a non-blur area. As described above, the main face is one of the faces detected by the image processing unit 60, which is determined most likely to be the face of a main object, based on, for example, being close to the center of the angle of view, or being large. The faces other than the main face are referred to as sub faces.

In steps S307 to S310, the system control unit 40 determines whether to blur the area corresponding to each distance group. In the first exemplary embodiment, if faces have been detected in step S305, the system control unit 40 sets the main face, the sub face located within a predetermined depth from the main face, and the body areas corresponding to the main face and the sub face as non-blur areas. This is because if the accuracy of the object distance measurement is low, inappropriate blurring processing might be performed in which objects with close object distances are blurred at different blurring levels. Particularly, if the distance to an object is obtained through the contrast detection as in the first exemplary embodiment, the accuracy of distance information obtained for a low-contrast object such as a face of a person is low. Thus, the processing of the first exemplary embodiment is highly effective. First, in step S307, the system control unit 40 determines whether a distance group is the same as that of the main face area. The peak position of the main face has been obtained in step S205. If the peak position group of this distance group is the same as the peak position group of the main face, the distance group is determined to be the same as the distance group of the main face. If the distance group is determined to be the same as that of the main face (YES in step S307), the processing proceeds to step S309. In step S309, the area corresponding to the distance group is set as a non-blur area.

In step S308, the system control unit 40 determines whether the distance group is the same as that of the sub face located within the predetermined depth (predetermined distance) from the main face. In the first exemplary embodiment, the distance information (peak position) of a face other than the main face has also been obtained in step S205. Thus, the system control unit 40 searches for a sub face located within the predetermined depth from the main face by referring to the distance information (peak position). Then, the system control unit 40 determines whether the peak position group of the distance group is the same as the peak position group of the detected sub face located within the predetermined depth from the main face. If the peak position groups are the same, the system control unit 40 determines that the distance group is the same as the distance group of the sub face located within the predetermined depth from the main face (YES in step S308), and the processing proceeds to step S309. In step S309, the system control unit 40 sets the corresponding area as a non-blur area. Here, only the sub face area may be set as a non-blur area, instead of setting the entire area corresponding to the same distance group as that of the sub face located within the predetermined depth from the main face, as a non-blur area.

In step S310, the system control unit 40 determines whether all the distance groups have been checked to determine whether to blur the corresponding area. If the system control unit 40 determines that all the distance groups have been checked (YES in step S310), the processing proceeds to step S311.

In step S311, the system control unit 40 further adds the body areas corresponding to non-blur faces (the main face and the sub face located within the predetermined depth from the main face) to the non-blur area. The area in a certain range below each of the faces is estimated to be the body area, and the color group corresponding to the area is searched for. The size of the range can be changed according to the size of the detected face, and the position of the range can be corrected according to the angle of the detected face. The area corresponding to the detected color group is set as a non-blur area.

It is assumed here that, in an example illustrated in FIGS. 5A, 5B, 5C, and 5D, the left face is detected as the main face and the right face is detected as the sub face in step S305, and the peak positions of the main face and the sub face obtained in step S205 are 9 and 12, respectively. In this case, in step S306, the system control unit 40 sets the left face as a non-blur area, and then in steps S307 and S309, sets a distance group belonging to the same peak position group as that of the peak position (9) of the left face (i.e., distance 0) as a non-blur area. Thus, no blur effects are applied to the left person including the body. At this point, the right person has not been set as a non-blur area since the distance group thereof is different. Then, in step S308, the system control unit 40 searches for a sub face located within a predetermined depth from the main face. For example, if the difference in the peak position between a face and the main face is 5 or smaller, the face is determined to be located within the predetermined depth from the main face. In this case, in step S309, the right face is determined as a sub face located within the predetermined depth from the main face, and the system control unit 40 adds a distance group belonging to the same peak position group as that of the peak position (12) of the right face (i.e., distance 1) to the non-blur area. Further, in step S311, the system control unit 40 adds the color group including the area below the right face to the non-blur area so that a blur effect cannot be applied to the right person including the body. Here, the color group below the face is set as a non-blur area because in many cases, using the color information makes it relatively easier to distinguish the body from the background. Alternatively, a distance group including the area below the face may be set as a non-blur area instead of the color group.

If no face has been detected in step S305, the system control unit 40 determines a non-blur area in step S312. An area determined as a focusing target in step S206 is set as a non-blur area. Or, one having a large area or being closer to the center of the angle of view is selected among from the distance groups and the area corresponding to the distance group is set as a non-blur area.

In steps S313 to S315, the system control unit 40 determines whether to blur the area of each distance group. If no face has been detected in step S305, only the distance group corresponding to the area determined in step S312 is set as a non-blur area.

In step S313, the system control unit 40 determines whether a distance group is the same as that of the area determined in step S312. If the system control unit 40 determines that the distance group is the same as that of the area determined in step S312 (YES in step S313), the processing proceeds to step S314. In step S314, the system control unit 40 sets the area corresponding to this distance group as a non-blur area.

In step S315, the system control unit 40 determines whether all the distance groups have been checked to determine whether to blur the corresponding area. If the system control unit 40 determines that all the distance groups have been checked (YES in step S315), the processing proceeds to step S316.

In step 316, the system control unit 40 sets areas other than the non-blur areas set in steps S309, S311, and S313 as the blur areas subject to the blurring processing in step S218. In step S316, the system control unit 40 also sets the blurring amount (blurring level) of each of the area according to the distance group of the area. When the system control unit 40 has completed the blur area setting in step S316, the blur area setting processing S207 is ended.

As described above, in the first exemplary embodiment, objects with similar object distances are grouped, and the level of the blurring processing (blurring level) is changed among the groups when the blurring processing is performed based on the distance information on an object distance for each of the small areas in an image. Even when a sub object detected within a predetermined depth from a main object belongs to a different group than that of the main object, a setting can be made not to blur the sub object similarly to the main object, or to perform the blurring processing on the sub object at a level lower than that on the other areas in the same group. Thus, when a plurality of objects is photographed, an image to which a more natural blur effect is applied can be generated.

A second exemplary embodiment will be described below.

In the first exemplary embodiment, a distance group is generated using color information and distance information in step S304. In the second exemplary embodiment, a blur area is set without generating a distance group. The processing in the second exemplary embodiment is similar to that in the first exemplary embodiment, except for the blur area setting processing in step S207.

Figure 6:
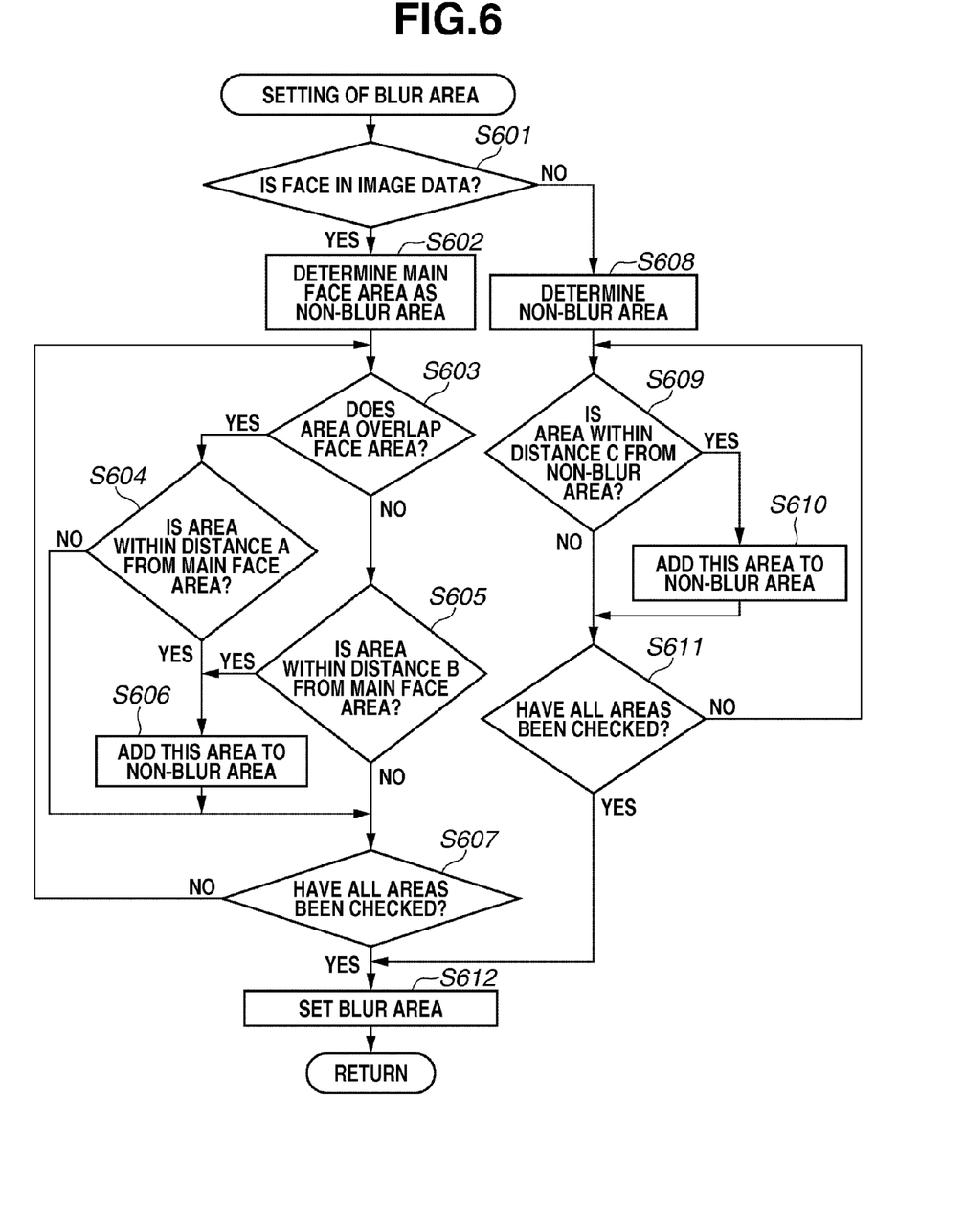
FIG. 6 is a flowchart of blur area setting processing according to a second exemplary embodiment of the present invention.

FIG. 6 is a flowchart of the blur area setting processing performed in step S207 according to the second exemplary embodiment.

If a face has been detected in image data (YES in step S601), then in step S602, the system control unit 40 sets the area of a detected main face as a non-blur area.

In steps S603 to S607, the system control unit 40 determines whether to perform the blurring processing on each of the M×N areas in the distance map. The number of division areas subject to the blurring setting is not limited to M×N. However, the M×N division areas are used in the second exemplary embodiment because M×N is more appropriate for use in the distance map.

In step S603, the system control unit 40 determines whether each of the areas overlaps a detected face area.

If the system control unit 40 determines that the area overlaps the face area (YES in step S603), the processing proceeds to step S604. In step S604, the system control unit 40 refers to the distance map obtained in step S203 to obtain the distance information corresponding to the area. If the difference in the distance information between the area and the main face area is a first threshold value (distance A) or smaller (YES in step S604), then in step S606, the system control unit 40 sets the area as a non-blur area. If the distance A is set similarly to the predetermined depth set in step S308, a sub face located within the predetermined depth from the main face can be prevented from being blurred, as in the first exemplary embodiment.

If the area does not overlap the face area (NO in step S603), the processing proceeds to step S605. In step S605, the system control unit 40 refers to the distance map to obtain the distance information corresponding to the area, as in step S604. If the difference in the distance information between the area and the main face area is a second threshold value (distance B) or smaller, then in step S606, the system control unit 40 sets the area as a non-blur area. Here, the distance A is set to be larger than the distance B so that the face area can be set as a non-blur area even if the accuracy of the distance information is reduced to some extent.

In step S607, the system control unit 40 determines whether all the areas have been checked to determine whether to blur each of the areas. If the system control unit 40 determines that all the areas have been checked (YES in step S607), the processing proceeds to step S612.

If no face has been detected (NO in step S601), then in step S608, the system control unit 40 determines a non-blur area. For example, the non-blur area may be the area determined as a focusing target in step S206.

In steps S609 to S611, the system control unit 40 determines whether to blur each of the M×N areas in the distance map.

The system control unit 40 refers to the distance map obtained in step S203 to obtain the distance information corresponding to the area. If the difference in the distance information between the area and the non-blur area determined in step S608 is within a predetermined distance (distance C) (YES in step S609), then in step S610, the system control unit 40 sets the area as a non-blur area. The distance C can be set similarly to the distance B.

In step S611, the system control unit 40 determines whether all the areas have been checked to determine whether to blur each of the areas. If the system control unit 40 determines that all the areas have been checked (YES in step S611), the processing proceeds to step S612.

In step S612, the system control unit 40 sets areas other than the non-blur areas set in steps S606 and S610 as the areas subject to the blurring processing in step S218. In step S612, the system control unit 40 also sets the blurring amount (blurring level) based on the distance information of each of the areas. When the system control unit 40 has completed the blur area setting in step S612, the blur area setting processing in step S207 is ended.

In the first and second exemplary embodiments, the areas set to be non-blur areas based on the conditions in steps S309, S311, S314, S606, and S610 may be set as the areas to be blurred at a lower blurring level than the blur area, instead of the non-blur areas.

When a plurality of objects is photographed, an image to which a more natural blur effect is applied can be generated.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-285260 filed Dec. 27, 2012, which is hereby incorporated by reference herein in its entirety.

What is claimed is:

1. An image processing apparatus comprising:
an acquisition unit configured to acquire image data;
a detection unit configured to detect objects from the image data;
a selection unit configured to select a main object from the detected objects;
an object distance information acquisition unit configured to acquire information regarding distance to the detected objects;
a distance information acquisition unit configured to divide the image data into small areas, and acquire object distance information for each of the small areas;
a distance grouping unit configured to, based on the distance information, group the small areas into distance groups defined by different distance ranges;
a determination unit configured to determine a blurring level for each of the distance groups; and
a blurring processing unit configured to perform blurring processing on the image data based on the blurring level,
wherein the determination unit identifies an object located within a predetermined distance from the main object, based on the distance information acquired by the object distance information acquisition unit, and determines areas corresponding to a distance group of the identified object as a same blurring level as an area corresponding to the main object.

2. The image processing apparatus according to claim 1, wherein the determination unit determines a first blurring level according to a difference in the distance information between each of the small areas and a main object area, identifies an object located within a predetermined distance from the main object based on the distance information acquired by the object distance information acquisition unit, and applies a second blurring level lower than the first blurring level to a distance group of the identified object.

3. The image processing apparatus according to claim 1, wherein the distance grouping unit generates a histogram of the distance information and groups the distance information based on the generated histogram.

4. The image processing apparatus according to claim 1, wherein the determination unit changes a method for determining the blurring level based on whether each of the small areas overlaps an object detected by the detection unit.

5. The image processing apparatus according to claim 4, wherein the determination unit determines a first blurring level according to a difference in the distance information between each of the small areas and a main face area, determines to apply the first blurring level to each of the small areas that do not overlap a face area detected by the detection unit, and determines to apply a second blurring level lower than the first blurring level to each of the small areas that overlap the face area detected by the detection unit.

6. The image processing apparatus according to claim 4, wherein the determination unit determines each of the small areas which do not overlap an object area detected by the detection unit as a non-blur area if a difference in the distance information between each of the small area and the main object area is a first threshold value or smaller, and determines each of the small areas which overlap the object area detected by the detection unit as a non-blur area if a difference in the distance information between each of the small area and the main object area is a second threshold value or smaller, the second threshold value being larger than the first threshold value.

7. The image processing apparatus according to claim 1, wherein the detection unit performs face detection processing to detect a face as an object from the image data.

8. The image processing apparatus according to claim 1, wherein the blurring processing unit performs the blurring processing by separately performing a plurality of different blurring processes on the entire image data to generate multi-level pieces of blurred image data, and then combines a piece of the blurred image data with each of the small areas based on the distance information.

9. The image processing apparatus according to claim 1, wherein the blurring processing unit performs the blurring processing by applying different filter processing with a different number of taps to each of the small areas.

10. The image processing apparatus according to claim 1, wherein the acquisition unit receives a light flux incident on an imaging optical system including a focusing lens to generate image data.

11. The image processing apparatus according to claim 10, wherein the object distance information acquisition unit acquires the distance information of each of the small areas based on an evaluation value obtained by moving the focusing lens for each of the small areas.

12. The image processing apparatus according to claim 1, wherein the object distance information acquisition unit is a distance measurement sensor capable of measuring a distance based on a phase difference.

13. A method for image processing comprising:
acquiring image data;
detecting objects from the image data;
selecting a main object from the detected objects;
acquiring information regarding distances to the detected objects;
dividing the image data into small areas, and acquiring object distance information for each of the small areas;
grouping the small areas into distance groups defined by different distance ranges, based on the distance information;
determining a blurring level for each of the distance groups;

performing blurring processing on the image data based on the blurring level; and identifying an object located within a predetermined distance from the main object based on the acquired object distance information, and determining areas corresponding to a distance group of the identified object as a same blurring level as an area corresponding to the main object.

14. A non-transitory computer-readable storage medium storing a program that causes a computer to execute the method according to claim 13.

15. The image processing apparatus according to claim 1, wherein the determination unit determines areas corresponding to a distance group of the main object and areas corresponding to a distance group of the identified object as non-blur areas.

16. The image processing apparatus according to claim 1, wherein the object distance information acquisition unit and the distance information acquisition unit acquire distances at a depth direction in the image data.

17. An image processing apparatus comprising:
an acquisition unit configured to acquire image data;
a detection unit configured to detect objects from the image data;
a selection unit configured to select a main object from the detected objects;
an object distance information acquisition unit configured to acquire information regarding distance to the detected objects;
a distance information acquisition unit configured to divide the image data into small areas, and acquire object distance information for each of the small areas;
a distance grouping unit configured to, based on the distance information, group the small areas into distance groups defined by different distance ranges;
a determination unit configured to determine a blurring level for each of the distance groups; and
a blurring processing unit configured to perform blurring processing on the image data based on the blurring level,
wherein the determination unit determines a first blurring level according to a difference in the distance information between each of the small areas and a main face area, determines to apply the first blurring level to each of the small areas that do not overlap a face area detected by the detection unit, and determines to apply a second blurring level lower than the first blurring level to each of the small areas that overlap the face area detected by the detection unit.

18. A method for image processing comprising:
acquiring image data;
detecting objects from the image data;
selecting a main object from the detected objects;
acquiring information regarding distances to the detected objects;
dividing the image data into small areas, and acquiring object distance information for each of the small areas;
grouping the small areas into distance groups defined by different distance ranges, based on the distance information;
determining a blurring level for each of the distance groups;
performing blurring processing on the image data based on the blurring level; and
determining a first blurring level according to a difference in the distance information between each of the small areas and a main face area, determining to apply the first blurring level to each of the small areas that do not overlap a face area detected in the detection, and
determining to apply a second blurring level lower than the first blurring level to each of the small areas that overlap the face area.

* * * * *